United States Patent
Scheitlin et al.

(10) Patent No.: US 9,915,734 B2
(45) Date of Patent: Mar. 13, 2018

(54) SYSTEMS AND METHODS FOR AVERAGING SATELLITE SIGMAS AND READMITTING EXCLUDED SATELLITE MEASUREMENTS INTO DIFFERENTIAL CORRECTIONS AND INTEGRITY MONITORS

(71) Applicant: Honeywell International Inc., Morristown, NJ (US)

(72) Inventors: Joseph E. Scheitlin, Plymouth, MN (US); Mats Anders Brenner, Plymouth, MN (US)

(73) Assignee: Honeywell International Inc., Morris Plains, NJ (US)

( * ) Notice: Subject to any disclaimer, the term of this patent is extended or adjusted under 35 U.S.C. 154(b) by 735 days.

(21) Appl. No.: 14/522,401

(22) Filed: Oct. 23, 2014

(65) Prior Publication Data

US 2016/0116595 A1   Apr. 28, 2016

(51) Int. Cl.
*G01S 19/07* (2010.01)
*G01S 19/21* (2010.01)

(52) U.S. Cl.
CPC .............. *G01S 19/07* (2013.01); *G01S 19/21* (2013.01)

(58) Field of Classification Search
CPC ........... G01S 19/07; G01S 19/25; G01S 19/27
USPC ................... 342/357.44, 357.67, 357.64
See application file for complete search history.

(56) References Cited

U.S. PATENT DOCUMENTS 5,600,329 A * 2/1997 Brenner .............. G01S 5/009
340/979
6,799,116 B2 * 9/2004 Robbins .............. G01S 5/009
340/991
7,916,070 B2    3/2011 Alexander
8,013,789 B2    9/2011 van Graas et al.
2004/0058645 A1 3/2004 Brenner
2004/0257275 A1 12/2004 Yee et al.
(Continued)

FOREIGN PATENT DOCUMENTS

EP        2738574       6/2014
WO      2006104524     10/2006

OTHER PUBLICATIONS

European Patent Office, "Extended European Search Report from EP Application No. 15191072.6 dated Mar. 21, 2016", "from Foreign Counterpart of U.S. Appl. No. 14/522,401", Mar. 21, 2016, pp. 1-7, Published in: EP.

(Continued)

*Primary Examiner* — Harry K Liu
(74) *Attorney, Agent, or Firm* — Fogg & Powers LLC

(57) ABSTRACT

Systems and methods for averaging satellite sigmas and readmitting excluded satellite measurements into differential corrections and integrity monitors are provided. In one embodiment, a method comprises: calculating a first RFI based averaged sigma and a second RFI based averaged sigma, wherein the first RFI based averaged sigma includes a sigma for the excluded satellite measurement and wherein the second RFI based averaged sigma does not include the sigma for the excluded satellite measurement; and, readmitting the excluded satellite measurement into either a differential correction broadcast or a respective integrity monitor when the first RFI based averaged sigma is less than or equal to the second RFI based averaged sigma.

20 Claims, 2 Drawing Sheets

(56) References Cited

U.S. PATENT DOCUMENTS

| | | | |
|---|---|---|---|
| 2008/0062039 A1* | 3/2008 | Cohen | G01S 19/05 342/357.29 |
| 2008/0211715 A1 | 9/2008 | Feintuch et al. | |
| 2009/0251365 A1* | 10/2009 | Suzuki | G01S 19/41 342/357.24 |
| 2014/0152498 A1 | 6/2014 | Scheitlin et al. | |

OTHER PUBLICATIONS

Craven et al., "Studying the Effects of Interference on GNSS Signals", "Spirent Positioning Technology", 2013, pp. 1-8, Publisher: Spirent Federal Systems.

* cited by examiner

SYSTEMS AND METHODS FOR AVERAGING SATELLITE SIGMAS AND READMITTING EXCLUDED SATELLITE MEASUREMENTS INTO DIFFERENTIAL CORRECTIONS AND INTEGRITY MONITORS

BACKGROUND

A global navigation satellite system (GNSS) receiver receives signals from satellites. This GNSS receiver simultaneously generates replicas of those same signals. Upon receiving the transmitted signal, the GNSS receiver calculates the satellite range measurements based on the time it took the satellite signals to reach the GNSS receiver. These range measurements are, however, pseudorange measurements because the GNSS receiver does not generate the replicas exactly coincidental to the satellite due to the clock offset in the receiver.

In some embodiments, a GNSS receiver can be part of a ground-based augmentation system (GBAS). A GBAS station includes a set of GNSS receivers, also referred to herein as reference receivers (RRs), which help provide correction data to other GNSS receivers. More specifically, a GBAS station can compare the known distance between the satellite and the GNSS receiver and the computed pseudorange distance. Then, based on this difference, a GBAS station can compute correction data for the satellite signals, along with the 1-sigma for the correction data. This information is then broadcast to other GNSS receivers to aid in calculating their own positions. A broadcast of this type is also referred to as a Type 1 Broadcast. As a result, a GBAS station can increase the positional accuracy of GNSS receivers in the GNSS, which is beneficial for many applications, including precision aircraft approaches.

RRs included in a GBAS station can be subject to broadband radio frequency interference (RFI) that can affect the accuracy of the correction data. For example, when a global positioning system (GPS) RR (i.e., a RR incorporated in the satellite system in the United States) is subjected to an interfering broadband signal that exceeds power density levels of −110.5 dBm/MHz within the GPS L1 (1575.42 MHz) band, the GPS RR will experience a drop in signal to noise ratio ($C/N_0$) across all tracked satellites. While GPS is used as an example here, other satellite systems can be similarly affected by an interfering broadband signal, such as Galileo, etc. A satellite measurement calculated with a satellite signal that has a $C/N_0$ value below a minimum operating level will be excluded from use in the formation of differential correction data and from use in some integrity monitoring functions of the GBAS station. In some instances, after a period of time, the power of the interfering broadband signal decreases and/or the $C/N_0$ of the satellite signal increases. The problem then becomes, how quickly and with what certainty should the excluded satellite measurements be reaccepted into differential correction data and integrity monitoring.

For the reasons stated above and for reasons stated below which will become apparent to those skilled in the art upon reading and understanding the specification, there is a need in the art for improved systems and methods for readmittance of excluded satellite measurements in differential correction data and integrity monitors of a GBAS station.

SUMMARY

The Embodiments of the present invention provide systems and methods for averaging satellite sigmas and readmitting excluded satellite measurements into differential corrections and integrity monitors.

In one embodiment, a method comprises: calculating a first RFI based averaged sigma and a second RFI based averaged sigma, wherein the first RFI based averaged sigma includes a sigma for the excluded satellite measurement and wherein the second RFI based averaged sigma does not include the sigma for the excluded satellite measurement; and, readmitting the excluded satellite measurement into either a differential correction broadcast or a respective integrity monitor when the first RFI based averaged sigma is less than or equal to the second RFI based averaged sigma.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
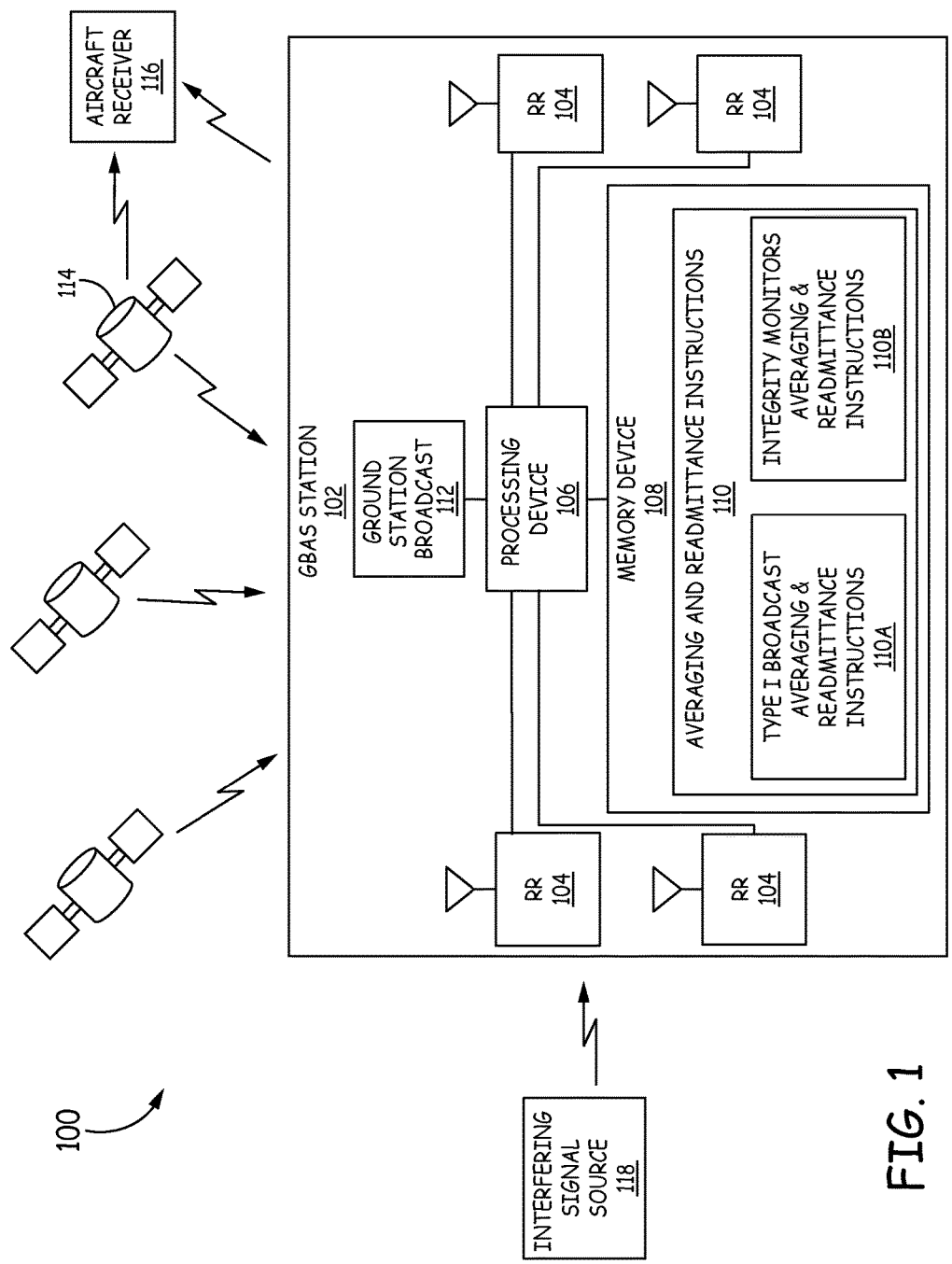
FIG. 1 is a block diagram of an example system that averages satellite sigmas and readmits an excluded satellite measurement into Differential Corrections or Integrity Monitors or both.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

I. Introduction

As discussed above, when a RR receives an interfering broadband signal that exceeds a certain power density level, measurement data produced by the RR that uses a satellite signal that has a $C/N_0$ value below a minimum operating level will no longer be included in differential correction data and is not used in certain integrity monitors by a GBAS station. Embodiments of the present disclosure present a set of rules for averaging satellite measurement sigmas across reference receivers and readmitting the excluded satellite measurements based on the $C/N_0$ of the satellite signals used in computing the excluded satellite measurements and the RFI based averaged measurement sigmas. The embodiments discussed herein can result in a readmittance process for excluded satellite measurements that is quicker than resetting the smoothing filters and waiting for them to reconverge, which can take a couple of minutes or longer.

II. Systems for Readmitting Excluded Satellite Measurements into Differential Corrections and Integrity Monitors FIG. 1 is a block diagram of an example system 100 that readmits an excluded satellite measurement in Differential Corrections or an Integrity Monitor or both. In at least one embodiment, GNSS satellites 114 provide signals as part of a GPS, a GLONASS, a Galileo system, a Compass system, or the like to a GBAS station 102. The signals are received by one or more reference receivers (RRs) 104 included in the GBAS station 102. The signals are then used by the RRs 104 to compute satellite measurements. Associated with each satellite measurement is a variance, also referred to herein as a sigma. By comparing the satellite measurements of the RRs 104 and the known position of the RRs 104, correction data can be calculated and sent by the GBAS station 102 in a ground station broadcast 112 (also referred to herein as a Type 1 broadcast) to other receivers using the GNSS satellites 114, such as an aircraft's receiver 116. Moreover, the satellite measurements can also be used in integrity monitors for the GBAS station 102. In exemplary embodiments, there are four RRs 104 included in a GBAS station 102. However, in some embodiments, more or less RRs 104 can be included in a GBAS station 102.

In system 100, when a interfering signal source 118 subjects a RR 104 to an interfering broadband signal that exceeds power density levels of approximately −110.5 dBm/MHz within the GPS L1 (1575.42 MHz) band, the RR 104 will experience a sudden drop in signal to noise ratio ($C/N_0$) across all tracked satellites 114. Any satellite measurements computed by the RR 104 using a satellite signal below a $C/N_0$ threshold will be excluded from use in differential corrections broadcast to other receivers (i.e., a Type 1 broadcast 112) and from use in the integrity monitors by the GBAS station 102 while the RR 104 is experiencing the interfering broadband signal. However, since restarting the smoothing filter delays measurement reacceptance, the excluded satellite measurement continues to be smoothed. An interfering broadband signal power density level of approximately −110.5 dBm/MHz is used as an example, however, other power densities may lead to excluding satellite measurements in a Type 1 broadcast and/or integrity monitors. Moreover, excluding satellite measurements based on interfering broadband signals is only an example of why satellite measurements may be excluded in a Type 1 broadcast and/or integrity monitors, but other reasons could lead to satellite measurements being excluded, and this example is not meant to be limiting.

When a satellite measurement of a RR 104 has been excluded for use in Type 1 broadcast set and/or integrity monitors, the processing device 106 in system 100 is configured to reaccept the excluded satellite measurement based on Averaging & Readmittance Instructions 110 stored in memory 108. In some embodiments, the Averaging & Readmittance Instructions 110 include separate Type 1 Broadcast Averaging & Readmittance Instructions 110A and Integrity Monitors Averaging & Readmittance Instructions 110B. In exemplary embodiments, the Type 1 Broadcast Averaging & Readmittance Instructions 110A and the Integrity Monitors Averaging & Readmittance Instructions 110B are not the same; however, in some embodiments, they may be the same instructions. The Type 1 Broadcast Averaging & Readmittance Instructions 110A are discussed first and the Integrity Monitors Averaging & Readmittance Instructions 110B are discussed later in this disclosure.

While the processing device 106 and the memory 108 are shown as being included in the GBAS station 102, in some embodiments, the processing device and memory 108 may be located outside the GBAS station 102.

A. Type 1 Broadcast Averaging & Readmittance Instructions

As stated above, a Type 1 Broadcast is a broadcast to receivers in a GNSS to refine the calculated position of those receivers. More specifically, based on the difference between the calculated positions of the RRs in a GBAS station 102 and the known positions of the RRs, a GBAS station 102 can compute correction data for the satellite signals, along with the variance for the correction data. This information is then broadcast to other GNSS receivers to aid in calculating their own positions.

Generally, in exemplary embodiments, the Type 1 Broadcast Averaging & Readmittance Instructions 110A re-includes an excluded satellite measurement in a Type 1 broadcast only when the satellite signal, used to compute the satellite measurement, has an instantaneous $C/N_0$ above the Instantaneous Low Power (ILP) readmittance level. In addition to requiring the excluded satellite measurement to have an instantaneous $C/N_0$ above the Instantaneous Low Power (ILP) readmittance level, the Type 1 Broadcast Averaging & Readmittance Instructions 110A may also require that an RFI based averaged sigma (as calculated according to the embodiments discussed below) is lower when the RFI based averaged sigma includes the sigma for the satellite measurement than when the RFI based averaged sigma does not include the sigma for the satellite measurement. (As stated above, each satellite measurement has a respective sigma associated with it.) For example, assume that a first RR's 104 satellite measurement has been excluded from a Type 1 Broadcast and without the first RR's 104 satellite measurement sigma included in the Type 1 Broadcast, the Type 1 Broadcast has an RFI based averaged sigma (i.e., standard deviation) equal to $\sigma_0$. Thus, in order for the excluded satellite measurement from the first RR 104 to be readmitted into the Type 1 Broadcast, the RFI based averaged sigma that includes the excluded satellite measurement sigma (referred to as $\sigma_1$) must be less than or equal to the RFI based averaged sigma without the excluded satellite measurement data (referred to as $\sigma_2$), i.e., $\sigma_1 < \sigma_2$. Before discussing how RFI based averaged sigmas are computed for each group of RRs 104, vertical protection limits (VPL) and lateral protection limits (LPL) are discussed because they play into determining the RFI based averaged sigmas for the groups of RRs 104.

1. Calculating VPL and LPL for Use in RFI Based Averaged Sigmas

As is known, an $H_0$ hypothesis assumes the situation where no faults are present in the satellite measurements (includes both the signal and the receiver measurements) used to compute the differential corrections. Under an $H_0$ hypothesis, the vertical protection levels (VPL) and lateral protection levels (LPL) are calculated according to the following equations:

$$VPL_{H0} = k_{ffmd} (\Sigma_{j=1}^{N} s_{vert,j}^2 \sigma_j^2)^{1/2} + D_V$$

$$LPL_{H0} = k_{ffmd} (\Sigma_{j=1}^{N} s_{lat,j}^2 \sigma_j^2)^{1/2} + D_L$$

For the $H_1$ hypothesis, which assumes the situation when a fault is present in one or more satellite measurements and is caused by one of the RRs 104 used in the ground station, the VPL and LPL are calculated according to the following equations:

$$VPL_{H1} = \max\{m=1,M\}[VPL_{H1}[j]] + D_V$$

$$LPL_{H1} = \max\{m=1,M\}[LPL_{H1}[j]] + D_L$$

where:

$$VPL_{H1}[j] = |\Sigma_{j=1}^{N_{svert,j}} b_j[m]| + k_{md}(\Sigma_{j=1}^{N_{svert,j}^2} \sigma_{j,H1}^2)^{1/2}$$

$$LPL_{H1}[j] = +|\Sigma_{j=1}^{N_{slat,j}} b_j[m]| + k_{md}(\Sigma_{j=1}^{N_{slat,j}^2} \sigma_{j,H1}^2)^{1/2}$$

In the equations above, j is the ranging source index, $K_{ffmd}$ is a multiplier which determines the probability of fault-free missed detection according to the following table:

| $K_{ffmd}$ | | |
|---|---|---|
| $M_{ffmd} = 2$ | $M_{ffmd} = 3$ | $M_{ffmd} = 4$ |
| 5.762 | 5.810 | 5.847 | where M[j] is equal to the number of ground station 102 RRs 104 whose pseudorange measurements were used to determine the differential correction for the $j^{th}$ ranging source used in the navigation solution and $M_{ffmd}$ is equal to the maximum M[j]. $K_{md}$ is the multiplier (unitless) which determines the probability of missed detection given that the ground subsystem is faulted according to the following table:

| $K_{md}$ | | |
|---|---|---|
| $M_{md} = 2$ | $M_{md} = 3$ | $M_{md} = 4$ |
| 2.935 | 2.898 | 2.878 | where $M_{md}$ is equal to the minimum M[j]. $b_j[m]$ is the B value (in meters) for the $j^{th}$ ranging source as indicated in the Type 1 Message. $s_{(),()}$ are elements of the Approach Service Type dependent weighted least squares projection matrix S used in the generation of the precision approach guidance outputs. $\sigma_j^2 = \sigma_{pr,gnd,j}^2 + \sigma_{tropo,j}^2 + \sigma_{pr,air,j}^2 + \sigma_{iono,j}^2$, where $\sigma_{pr,gnd,j}^2$ is dependent on the active Approach Service Type; $\sigma_{tropo,j}^2$ is the residual tropospheric uncertainty (in meters) for satellite j; $\sigma_{pr,air,j}^2$ is the total (post correction) fault-free airborne error term (in meters) for satellite j: and, $\sigma_{iono,j}^2$ is the residual Ionospheric uncertainty (in meters) for satellite $$j \cdot \sigma_{j,H1}^2 = \frac{M[j]}{M[j]-1} \sigma_{pr,gnd,j}^2 + \sigma_{tropo,j}^2 + \sigma_{pr,air,j}^2 + \sigma_{iono,j}^2.$$

$D_V$, $D_L$ are parameters that depend on the active Approach Service Type.

As can be seen from the formula for $\sigma_{j,H1}^2$, the equation assumes that sigma's in different RRs 104 are equal and uncorrelated. However, when some RRs 104 are affected by broadband interference by an interfering signal source 118, which is the case here, such assumptions are not valid. Therefore, to ensure that the RFI based averaging rules cover both the $H_0$ and $H_1$ protection levels, the protection level that has the greater RFI based averaged sigma for the number of RRs 104 used in the Type 1 Broadcast is chosen. $\sigma_{tropo,j}^2$, $\sigma_{pr,air,j}^2$, $\sigma_{iono,j}^2$ are unrelated to the embodiments disclosed herein and therefore, for simplicity, they'll be omitted in the following discussion and $\sigma_{pr,gnd,j}^2$ will be referred to when discussing how to calculate the satellite measurement sigmas, $\sigma_j^2$.

2. Calculating RFI Based Averaged Sigmas for Type 1 Broadcast

In conventional implementations, satellite measurement sigmas from different RRs 104 are combined in a root mean sum (RSS); however, dominant broadband has been present and the satellite measurements may be correlated between RRs 104, so the satellite measurement sigmas from different RRs 104 cannot be combined in a traditional RSS. Moreover, a satellite measurement sigma from an RR 104 may be small while another satellite measurement sigma from a different RR 104 may be large, which is not compliant with the assumptions used in the airborne GBAS receivers. Therefore, a RSS is not always the best strategy to combine the satellite measurement sigmas from different RRs 104 and a different averaging technique is discussed below.

For the following discussion, the number of RRs 104 on satellite j is defined as M[j]. To ensure the averaging rules cover both H0 and H1 protection levels, the M[j] RRs 104 that are averaged over to calculate a $\sigma_{pr,gnd,j}^2$ (and therefore $\sigma_j^2$) for H0 are assumed to be configured in the worst possible way relative to the broadband interference. Similarly, M[j]−1 RRs 104 that are averaged over to calculate $\sigma_{pr,gnd,j}^2$ for H1 are also assumed to be configured in the worst possible way relative to the broadband interference. That is, the RR 104 that has the smallest satellite measurement sigma is monitored by the M[j]−1 RRs 104 with the largest satellite measurement sigmas affected by the broadband interference such that the pair with the largest satellite measurement sigmas are correlated. Since the mitigating factor $$\frac{M[j]}{M[j]-1}$$

in the equation for $\sigma_{j,H1}^2$ above will be applied to the airborne system, the resulting H1 variance can be divided by the factor $$\frac{M[j]}{M[j]-1}$$

so the H1 variance calculated will be recreated in the expression for $\sigma_{j,H1}^2$. The $\sigma_{pr,gnd,j}^2$, as determined by the Type 1 Broadcast Averaging & Readmittance Instructions 110A, is then the larger of the H0 and H1 sigma's that were calculated. As a result, in exemplary embodiments, the Type 1 Broadcast Averaging & Readmittance Instructions 110A includes the following rules for calculating $\sigma_{pr,gnd,j}^2$.

For 2 RRs 104, i.e., M[j]=2, which implies $$\frac{M[j]}{M[j]-1} = 2,$$

where two RRs 104 in the GBAS station 102 have been excluded from use in the Type 1 Broadcast, the sigma's (for satellite j) from different RRs 104 are ordered such that $\sigma_1 < \sigma_2$. $\sigma_{pr,gnd,j}^2$ is then equal to the following:

$$\sigma^2_{pr,gnd,j} = \max\left[(\sigma_1 + \sigma_2)^2/2^2, \frac{1}{2}\sigma_2^2\right] + \text{etc.}$$

where the first term corresponds to the sigma for the H0 protection level and the second term corresponds to the sigma for the H1 protection level. The etc. in the equation above and below includes other unrelated contributions such as natural signal deformation, nominal acceleration, etc.

For M[j]=3, which implies $$\frac{M[j]}{M[j]-1} = 3/2,$$

the sigma's (for satellite j) from different RRs 104 are ordered such that $\sigma_1 < \sigma_2 < \sigma_3$ and $\sigma_{pr,gnd,j}^2$ is then equal to the following:

$$\sigma^2_{pr,gnd,j} = \max\left[(\sigma_1^2 + (\sigma_2 + \sigma_3)^2)/3^2, \frac{2}{3}(\sigma_2 + \sigma_3)^2/2^2\right] + \text{etc.}$$

Similarly, the first term corresponds to the sigma for the H0 protection level and the second term corresponds to the sigma for the H1 protection level.

For M[j]=4, which implies $$\frac{M[j]}{M[j]-1} = 4/3,$$

the sigma's (for satellite j) from different RRs 104 are ordered such that $\sigma_1 < \sigma_2 < \sigma_3 < \sigma_4$, $$\sigma^2_{pr,gnd,j} = \max\left[((\sigma_1 + \sigma_2)^2(\sigma^3 + \sigma^4)^2)/4^2, \frac{3}{4}((\sigma_2^2 + (\sigma_3 + \sigma_4)^2)/3^2\right] + \text{etc.}$$

Likewise, the first term corresponds to the sigma for the H0 protection level and the second term corresponds to the sigma for the H1 protection level.

In summary, the Type 1 Broadcast Averaging & Readmittance Instructions 110A includes the following instructions for calculating $\sigma_{pr,gnd,j}^2$ for the $N^{th}$ satellite, M[j] RRs 104 and the sigmas for different RRs 104 ordered in the following way $\sigma_1 < \sigma_2 < \sigma_3 < \sigma_4$:

$$\sigma^2_{pr,gnd,j}(N, M[j]) = \begin{cases} \max\left[(\sigma_N^1 + \sigma_N^2)^2/2^2, \frac{1}{2}(\sigma_N^2)^2\right] + \text{etc.} & |M[j]=2 \\ \max\left[((\sigma_N^1)^2 + (\sigma_N^2 + \sigma_N^3)^2)/3^2, \right. \\ \left. \frac{2}{3}(\sigma_N^2 + \sigma_N^3)^2/2^2\right] + \text{etc.} & |M[j]=3 \\ \max\left[((\sigma_N^1 + \sigma_N^2)^2 + (\sigma_N^3 + \sigma_N^4)^2)/4^2, \right. \\ \left. \frac{3}{4}((\sigma_N^2)^2 + (\sigma_N^3 + \sigma_N^4)^2)/3^2\right] + \text{etc.} & |M[j]=4 \end{cases}$$

Throughout this disclosure, reference will also be made to the broadband sigma, $\sigma_{BB}^2$, where $\sigma_{BB}^2 = \sigma_{pr,gnd,j}^2$—etc. Therefore, $$\sigma^2_{BB}(N, M[j]) = \begin{cases} \max\left[(\sigma_N^1 + \sigma_N^2)^2/2^2, \frac{1}{2}(\sigma_N^2)^2\right] & |M[j]=2 \\ \max\left[((\sigma_N^1)^2 + (\sigma_N^2 + \sigma_N^3)^2)/3^2, \right. \\ \left. \frac{2}{3}(\sigma_N^2 + \sigma_N^3)^2/2^2\right] & |M[j]=3 \\ \max\left[((\sigma_N^1 + \sigma_N^2)^2 + (\sigma_N^3 + \sigma_N^4)^2)/4^2, \right. \\ \left. \frac{3}{4}((\sigma_N^2)^2 + (\sigma_N^3 + \sigma_N^4)^2)/3^2\right] & |M[j]=4 \end{cases}$$

As can be seen from the equations discussed above, the superscripts of the $\sigma$'s are not an exponent of the $\sigma$'s. Each of the $\sigma^1$, $\sigma^2$, $\sigma^3$, $\sigma^4$ correspond to a sigma for a satellite measurement from a respective reference receiver such that $\sigma^1 < \sigma^2 < \sigma^3 < \sigma^4$.

3. Readmitting Satellite Measurements in Type 1 Broadcast

Moreover, as stated above, in exemplary embodiments, the Type 1 Broadcast Averaging & Readmittance Instructions 110A also includes instructions for readmitting an excluded satellite measurement of a RR 104 in a Type 1 Broadcast when the $\sigma_{pr,gnd,j}^2$ that includes the sigma for the RR 104 producing the excluded satellite measurement is less than or equal to the $\sigma_{pr,gnd,j}^2$ without the sigma for the RR 104 producing the excluded satellite measurement, according to the averaging rules above. The $\sigma_{pr,gnd,j}^2$ that includes the sigma for the RR 104 producing the excluded satellite measurement will also be referred to herein as the first RFI based averaged sigma and the $\sigma_{pr,gnd,j}^2$ that does not include the sigma for the RR 104 that produces the excluded satellite measurement will also be referred to herein as the second RFI based averaged sigma. As an example, in attempting to use an excluded satellite measurement in a broadcast, if the $\sigma_{pr,gnd,j}^2$ for M[j]=3 (i.e., the first RFI based averaged sigma) is less than or equal to $\sigma_{pr,gnd,j}^2$ for M[j]=2 (i.e., the second RFI based averaged sigma), the excluded satellite measurement will be allowed to be readmitted into the broadcast. In exemplary embodiments, to test for readmittance using the equations for $\sigma_{pr,gnd,j}^2$ above, the Type 1 Broadcast Averaging & Readmittance Instructions 110A may include instructions that the measurement with the smallest satellite measurement sigma will be tested for readmittance first. If readmittance is successful, this process may be repeated by testing the measurement with the next smallest satellite measurement sigma. In some embodiments, the process continues until either the process does not readmit a satellite measurement or until all excluded satellite measurements have been readmitted. As is known, a Type 1 Broadcast requires at least two RRs 104 measurements to be included in the broadcast, which is why M[j]=1 is not shown.

B. Integrity Monitoring Averaging & Readmittance Instructions

As stated above, the system 100 also can include Integrity Monitor Averaging & Readmittance Instructions 110B, which determine when an excluded satellite measurement can be readmitted into the integrity monitor. Integrity monitoring includes, but is not limited to, the following: signal deformation monitoring (SDM), code-carrier divergence (CCD) monitoring, CCD high pass monitoring and carrier rate monitoring. In exemplary embodiments and similar to above, to be re-included in a particular integrity monitoring function, the Integrity Monitor Averaging & Readmittance Instructions 110B can require that the measurement's instantaneous $C/N_0$ be above the ILP readmittance level. An example of an ILP readmittance level is $$32 + 6.0 * \sqrt{\begin{array}{c}\text{Broadband Noise Variance +} \\ \text{(Carrier to Noise Variance other than Broadband/} \\ \text{\# satellite vehicles))}.\end{array}}$$

Moreover, in exemplary embodiments, the Integrity Monitor Averaging & Readmittance Instructions 110B can require the measurement's noise variance be below an acceptable level for the respective monitor. This condition can be dependent on the type of integrity monitor and can be adjusted accordingly. Furthermore, in exemplary embodiments, the Integrity Monitor Averaging & Readmittance Instructions 110B can require that the monitor's RFI based averaged sigma ($\sigma_{mon,j}$) with the satellite measurement sigma included in the $\sigma_{mon,j}$ be lower than the $\sigma_{mon,j}$ without the satellite measurement sigma included in it. The $\sigma_{mon,j}$ with the satellite measurement sigma included is also referred to herein as the first RFI based averaged sigma and the $\sigma_{mon,j}$ that does not include the satellite measurement sigma is referred to herein as the second RFI based averaged sigma.

1. Calculating RFI based averaged sigmas for Integrity Monitors

To calculate $\sigma_{mon,j}$ for satellite N, the Integrity Monitor Averaging & Readmittance Instructions 110B can include the following instructions, where $\sigma_1 < \sigma_2 < \sigma_3 < \sigma_4$:

$$\sigma^2_{Mon,j}(N, M[j]) = \begin{cases} (\sigma^1_N)^2 & |M[j] = 1, 2 \\ ((\sigma^1_N)^2 + (\sigma^2_N + \sigma^3_N)^2)/3^2 & |M[j] = 3 \\ ((\sigma^1_N + \sigma^2_N)^2 + (\sigma^3_N + \sigma^4_N)^2)/4^2 & |M[j] = 4 \end{cases}$$

Similar to above, the superscripts of the $\sigma$'s are not an exponent of the $\sigma$'s. Each of the $\sigma^1$, $\sigma^2$, $\sigma^3$, $\sigma^4$ correspond to a sigma for a satellite measurement from a respective reference receiver such that $\sigma^1 < \sigma^2 < \sigma^3 < \sigma^4$ 2. Readmitting Satellite Measurements in Integrity Monitors As an example, assume that a satellite measurement for a first RR 104 is excluded from an integrity monitor. To determine if the excluded satellite measurement can be readmitted into the integrity monitor, the Integrity Monitor Averaging & Readmittance Instructions 110B determine whether $\sigma_{Mon,j}$ with the excluded satellite measurement monitor sigma is less than or equal to $\sigma_{Mon,j}$ without the excluded satellite measurement monitor sigma. If it is, then the excluded satellite measurement can be readmitted in the integrity monitor. In exemplary embodiments, each integrity monitor's sigma for satellite N on RR 104 j is continuously computed. When a single measurement is excluded, the measurement is continuously tested for readmittance until it has satisfied the readmittance criteria.

Moreover, in exemplary embodiments, the Integrity Monitor Averaging & Readmittance Instructions 110B can require when multiple satellite measurements for the same satellite are excluded, the satellite measurement with the smallest monitor sigma can be tested for readmittance first. If readmittance is successful, this process is repeated by testing the satellite measurement with the next smallest monitor sigma. In some embodiments, this process is repeated until either the process fails to readmit a satellite measurement or until all excluded satellite measurements have been readmitted. As can be seen from the equations above, monitoring for one RRs 104 is allowed, unlike for the Type 1 Broadcast, which requires at least two RRs 104.

Figure 2:
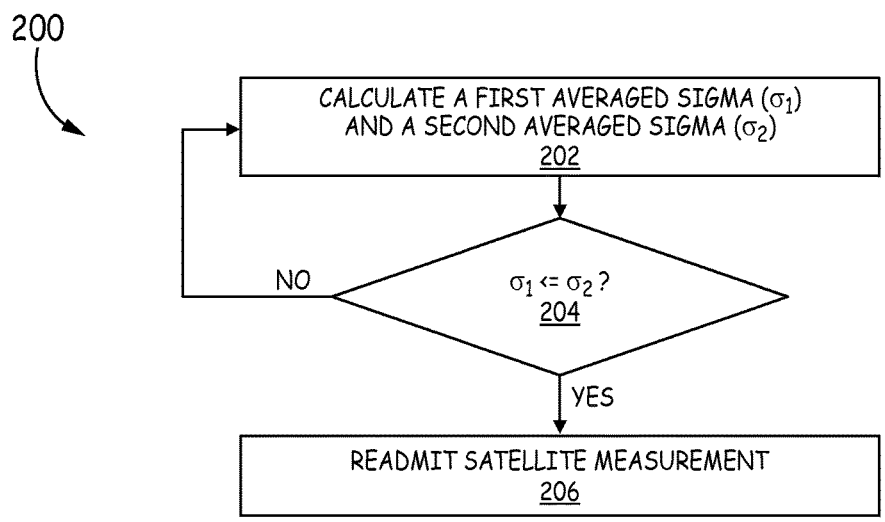
FIG. 2 is a flow diagram of an example method for averaging satellite sigmas and readmitting an excluded satellite measurement into Differential Corrections or Integrity Monitors or both.

III. Methods for Readmitting Excluded Satellite Measurements into Differential Corrections and Integrity Monitors FIG. 2 is a flow diagram of an example method 200 for averaging satellite measurement sigmas and readmitting an excluded satellite measurement in a Type 1 Broadcast or an Integrity Monitor or both. The method comprises calculating a first RFI based averaged sigma and a second RFI based averaged sigma, wherein the first RFI based averaged sigma includes a sigma for the excluded satellite measurement and the second RFI based averaged sigma does not include the sigma for the excluded satellite measurement (block 202). Similar to above, the excluded satellite measurement has a satellite measurement sigma and the reference receiver that produces the excluded satellite measurement can be included in a ground-based augmentation system (GBAS) station. In some embodiments, the reference receiver and the GBAS station can have some or all of the same characteristics as the RRs 104 and GBAS station 102 discussed above. As another example, the number of reference receivers included in the GBAS station is two, three or four, in exemplary embodiments; however, the number of reference receivers may be more or less in other embodiments. Similarly, in some embodiments, the reference receiver's satellite measurement can have some or all of the same characteristics as the satellite measurements discussed above. For example, the reference receiver's satellite measurement can be used in determining differential corrections for receivers or in integrity monitoring.

In some embodiments, the first RFI based averaged sigma and the second RFI based averaged sigma can have some or all of the same characteristics as the first RFI based averaged sigma and the second RFI based averaged sigma discussed above in FIG. 1. As an example, in some embodiments, the first RFI based averaged sigma and the second RFI based averaged sigma are ground broadcast sigmas. For example, in some embodiments, calculating the first RFI based averaged sigma and the second RFI based averaged sigma can be done according to the following equations:

$$\sigma^2_{BB}(N, M[j]) = \begin{cases} \max\left[(\sigma^1_N + \sigma^2_N)^2/2^2, \frac{1}{2}(\sigma^2_N)^2\right] & |M[j] = 2 \\ \max\left[((\sigma^1_N)^2 + (\sigma^2_N + \sigma^3_N)/3^2, \right. \\ \left. \frac{2}{3}(\sigma^2_N + \sigma^3_N)^2/2^2\right] & |M[j] = 3 \\ \max\left[((\sigma^1_N + \sigma^2_N)^2 + (\sigma^3_N + \sigma^4_N)^2)/4^2, \right. \\ \left. \frac{3}{4}((\sigma^2_N)^2 + (\sigma^3_N + \sigma^4_N)^2)/3^2\right] & |M[j] = 4 \end{cases}$$

wherein N is the satellite, M[j] is equal to the number of reference receivers in the ground-based augmentation system station used to compute a combined satellite measurement and wherein each of the $\sigma^1$, $\sigma^2$, $\sigma^3$, $\sigma^4$ correspond to a sigma for a satellite measurement from a respective reference receiver such that $\sigma^1 < \sigma^2 < \sigma^3 < \sigma^4$ Moreover, as another example, the first RFI based averaged sigma and the second RFI based averaged sigma can also be ground monitor sigmas. In this example, calculating the first RFI based averaged sigma and the second RFI based averaged sigma can be done according to the following equations:

$$\sigma^2_{Mon,j}(N, M[j]) = \begin{cases} (\sigma^1_N)^2 & |M[j]=1,2 \\ ((\sigma^1_N)^2 + (\sigma^2_N+\sigma^3_N)^2)/3^2 & |M[j]=3 \\ ((\sigma^1_N+\sigma^2_N)^2 + (\sigma^3_N+\sigma^4_N)^2)/4^2 & |M[j]=4 \end{cases}$$

wherein N is the satellite, M[j] is equal to the number of reference receivers in the ground-based augmentation system station used to compute a combined satellite measurement and wherein each of the $\sigma^1$, $\sigma^2$, $\sigma^3$, $\sigma^4$ correspond to a sigma for a satellite measurement from a respective reference receiver such that $\sigma^1 < \sigma^2 < \sigma^3 < \sigma^4$.

After calculating the first RFI based averaged sigma and the second RFI based averaged sigma at block 202, the two RFI based averaged sigmas are compared at block 204. If the first RFI based averaged sigma is less than or equal to the second RFI based averaged sigma, then the method 200 proceeds to block 206. However, if the first RFI based averaged sigma is greater than the second RFI based averaged sigma, then the method returns to block 202. This represents the situation where the sigma for the excluded satellite measurement degrades the RFI based averaged sigma too much to be readmitted.

Method 200 further comprises readmitting the excluded satellite measurement into either a differential correction broadcast or a respective integrity monitor when the first RFI based averaged sigma is less than or equal to the second RFI based averaged sigma (block 206). Similar to above, using the first RFI based averaged sigmas and the second RFI based averaged sigmas calculated in block 202, one can determine whether the first RFI based averaged sigma is less than or equal to the second RFI based averaged sigma.

In some embodiments, the method 200 can further comprise determining when an RFI based signal to noise ratio of the excluded satellite measurement is greater than or equal to an instantaneous power threshold (ILP). In some embodiments, if the $C/N_0$ is greater than the ILP, then, the excluded satellite measurement can be readmitted at block 206. However, if the $C/N_0$ of the excluded satellite measurement is less than the ILP, then, the method 200 may return to block 202. This represents the situation where the satellite signal used for the excluded satellite measurement is still too low to be readmitted.

In other embodiments, the method 200 may further comprise determining when a noise variance of the excluded satellite measurement is less than or equal to a respective readmittance level. In some embodiments, if the noise variance is less than or equal to the respective readmittance level, then, the excluded satellite measurement can be readmitted at block 206. However, if the noise variances is greater than the respective readmittance level, then, the method 200 may return to block 202.

In some embodiment, method 200 may further comprise excluding a satellite measurement from a differential correction broadcast or a respective integrity monitor when the signal to noise ratio of the reference receiver's satellite measurement is below a signal to noise threshold. Moreover, in some embodiments, method 200 may further comprise performing method 200 on more than one excluded satellite measurement. In some embodiments, if there is more than one excluded satellite measurement in the ground-based augmentation system station, the method 200 can be performed on the excluded satellite measurement that has the smallest sigma first. If that excluded satellite measurement is readmitted, then method 200 can be performed on the excluded satellite measurement that has the next smallest corresponding sigma.

The memory used in the present systems and methods can be any appropriate tangible and non-transitory processor readable medium used for storage of processor readable instructions or data structures. Suitable memory can include, but is not limited to, fuses, zener zap diodes, or erasable programmable read-only memory.

Control logic used in the present systems and methods can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The processing device can also include functions with software programs, firmware, or other computer readable instructions for carrying out various process tasks, calculations, and control functions used in the present method and system.

The present methods can be implemented by computer executable instructions, such as program modules or components, which are executed by at least one processor. Generally, program modules include routines, programs, objects, data components, data structures, algorithms, and the like, which perform particular tasks or implemented particular abstract data types.

Instructions for carrying out the various process tasks, calculations, and generation of other data used in operation of the methods described herein can be implemented in software, firmware, or other computer- or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programming logic device.

EXAMPLE EMBODIMENTS

Example 1 includes a method for averaging satellite sigmas and readmitting an excluded satellite measurement in the presence of radio frequency interference, the method comprising: calculating a first RFI based averaged sigma and a second RFI based averaged sigma, wherein the first RFI based averaged sigma includes a sigma for the excluded satellite measurement and wherein the second RFI based averaged sigma does not include the sigma for the excluded satellite measurement; and readmitting the excluded satellite measurement into either a differential correction broadcast or a respective integrity monitor when the first RFI based averaged sigma is less than or equal to the second RFI based averaged sigma.

Example 2 includes the method of Example 1, further comprising: determining when a signal to noise ratio of the excluded satellite measurement is greater than or equal to an instantaneous power threshold.

Example 3 includes the method of any of Examples 1-2, further comprising: determining when a noise variance of the excluded satellite measurement is less than or equal to a respective monitor readmittance level.

Example 4 includes the method of any of Examples 1-3, wherein if there is more than one excluded satellite measurement in a ground-based augmentation system station, the method is performed first on the excluded satellite measurement that has the smallest RFI based averaged sigma.

Example 5 includes the method of any of Examples 1-4, wherein the first RFI based averaged sigma and the second RFI based averaged sigma are ground broadcast sigmas.

Example 6 includes the method of Example 5, wherein calculating the first RFI based averaged sigma and the second RFI based averaged sigma is according to the following equations:

$$\sigma_{BB}^2(N, M[j]) = \begin{cases} \max\left[(\sigma_N^1 + \sigma_N^2)^2/2^2, \frac{1}{2}(\sigma_N^2)^2\right] & |M[j] = 2 \\ \max\left[((\sigma_N^1)^2 + (\sigma_N^2 + \sigma_N^3)/3^2, \\ \frac{2}{3}(\sigma_N^2 + \sigma_n^3)^2/2^2\right] & |M[j] = 3 \\ \max\left[((\sigma_N^1 + \sigma_N^2)^2 + (\sigma_N^3 + \sigma_N^4)^2)/4^2, \\ \frac{3}{4}((\sigma_N^2)^2 + (\sigma_N^3 + \sigma_N^4)^2)/3^2\right] & |M[j] = 4 \end{cases}$$

wherein N is the satellite, M[j] is equal to the number of reference receivers in a ground-based augmentation system station used to compute a combined satellite measurement and wherein each of the $\sigma^1$, $\sigma^2$, $\sigma^3$, $\sigma^4$ correspond to a sigma for a satellite measurement from a respective reference receiver such that $\sigma^1 < \sigma^2 < \sigma^3 < \sigma^4$.

Example 7 includes the method of any of Examples 1-6, wherein the first RFI based averaged sigma and the second RFI based averaged sigma are ground monitor sigmas.

Example 8 includes the method of Example 7, wherein calculating the first RFI based averaged sigma and the second RFI based averaged sigma is according to the following equations:

$$\sigma_{Mon,j}^2(N, M[j]) = \begin{cases} (\sigma_N^1)^2 & |M[j] = 1, 2 \\ ((\sigma_N^1)^2 + (\sigma_N^2 + \sigma_N^3)^2)/3^2 & |M[j] = 3 \\ ((\sigma_N^1 + \sigma_N^2)^2 + (\sigma_N^3 + \sigma_N^4)^2)/4^2 & |M[j] = 4 \end{cases}$$

wherein N is the satellite, M[j] is equal to the number of reference receivers in a ground-based augmentation system station used to compute a combined satellite measurement and $\sigma^1$, $\sigma^2$, $\sigma^3$, $\sigma^4$ correspond to a sigma for a satellite measurement from a respective reference receiver such that $\sigma^1 < \sigma^2 < \sigma^3 < \sigma^4$.

Example 9 includes a ground-based augmentation system station comprising: at least one reference receiver; at least one memory device; and at least one processing device communicatively coupled to the at least one reference receiver and the at least one memory device, the at least one processing device configured to: determine when a first RFI based averaged sigma is less than or equal to a second RFI based averaged sigma, wherein the first RFI based averaged sigma includes a sigma for the excluded satellite measurement and wherein the second RFI based averaged sigma does not include the sigma for the satellite measurement sigma; and readmit the excluded satellite measurement into either a differential correction broadcast or a respective integrity monitor when the first RFI based averaged sigma is less than or equal to the second RFI based averaged sigma.

Example 10 includes the ground-based augmentation system station of Example 9, wherein the at least one processing device is further configured to: determine when a signal to noise ratio of the excluded satellite measurement is greater than an instantaneous power threshold.

Example 11 includes the ground-based augmentation system station of any of Examples 9-10, wherein the at least one processing device is further configured to: determine when a noise variance of the excluded satellite measurement is less than or equal to a respective monitor readmittance level.

Example 12 includes the ground-based augmentation system station of any of Examples 9-11, wherein the at least one reference receiver comprises two, three or four reference receivers.

Example 13 includes the ground-based augmentation system station of any of Examples 9-12, wherein if there is more than one excluded satellite measurement in the ground-based augmentation system station, the at least one processing device is configured to readmit the excluded satellite measurement that has the smallest RFI based averaged sigma into either differential correction broadcast or the respective integrity monitor when the first RFI based averaged sigma is less than or equal to the second RFI based averaged sigma first.

Example 14 includes the ground-based augmentation system station of any of Examples 9-13, wherein the first RFI based averaged sigma and the second RFI based averaged sigma are ground broadcast sigmas.

Example 15 includes the ground-based augmentation system station of Example 14, wherein the at least one processing device calculates the first RFI based averaged sigma and the second RFI based averaged sigma according to the following equations:

$$\sigma_{BB}^2(N, M[j]) = \begin{cases} \max\left[(\sigma_N^1 + \sigma_N^2)^2/2^2, \frac{1}{2}(\sigma_N^2)^2\right] & |M[j] = 2 \\ \max\left[((\sigma_N^1)^2 + (\sigma_N^2 + \sigma_N^3)/3^2, \\ \frac{2}{3}(\sigma_N^2 + \sigma_n^3)^2/2^2\right] & |M[j] = 3 \\ \max\left[((\sigma_N^1 + \sigma_N^2)^2 + (\sigma_N^3 + \sigma_N^4)^2)/4^2, \\ \frac{3}{4}((\sigma_N^2)^2 + (\sigma_N^3 + \sigma_N^4)^2)/3^2\right] & |M[j] = 4 \end{cases}$$

wherein N is the satellite, M[j] is equal to the number of reference receivers in the ground-based augmentation system station and wherein each of the $\sigma^1$, $\sigma^2$, $\sigma^3$, $\sigma^4$ correspond to a sigma for a satellite measurement from a respective reference receiver such that $\sigma^1 < \sigma^2 < \sigma^3 < \sigma^4$.

Example 16 includes the ground-based augmentation system station of any of Examples 9-15, wherein the first RFI based averaged sigma and the second RFI based averaged sigma are ground monitor sigmas.

Example 17 includes the ground-based augmentation system station of Example 16, wherein the at least one processing device calculates the first RFI based averaged sigma and the second RFI based averaged sigma according to the following equations:

$$\sigma_{Mon,j}^2(N, M[j]) = \begin{cases} (\sigma_N^1)^2 & |M[j] = 1, 2 \\ ((\sigma_N^1)^2 + (\sigma_N^2 + \sigma_N^3)^2)/3^2 & |M[j] = 3 \\ ((\sigma_N^1 + \sigma_N^2)^2 + (\sigma_N^3 + \sigma_N^4)^2)/4^2 & |M[j] = 4 \end{cases}$$

wherein N is the satellite, M[j] is equal to the number of reference receivers in the ground-based augmentation system station and wherein each of the $\sigma^1$, $\sigma^2$, $\sigma^3$, $\sigma^4$ correspond to a sigma for a satellite measurement from a respective reference receiver such that $\sigma^1 < \sigma^2 < \sigma^3 < \sigma^4$.

Example 18 includes a non-transitory computer-readable medium comprising computer program logic recorded thereon for: comparing a first RFI based averaged satellite measurement sigma with a second RFI based averaged satellite measurement sigma; and readmitting the excluded reference receiver's satellite measurement into either a differential correction broadcast or a respective integrity monitor when the first RFI based averaged satellite measurement sigma is less than or equal to the second RFI based averaged satellite measurement sigma.

Example 19 includes the non-transitory computer-readable medium of Example 18, wherein calculating the first RFI based averaged sigma and the second RFI based averaged satellite measurement sigma are calculated using at least one of the following equations:

$$\sigma^2_{pr,gnd,j}(N, M[j]) = \begin{cases} \max\left[(\sigma^1_N + \sigma^2_N)^2/2^2, \frac{1}{2}(\sigma^2_N)^2\right] + \text{etc.} & |M[j] = 2 \\ \max\left[(\sigma^1_N)^2 + (\sigma^2_N + \sigma^3_N)/3^2, \frac{2}{3}(\sigma^2_N + \sigma^3_n)^2/2^2\right] + \text{etc.} & |M[j] = 3 \\ \max\left[((\sigma^1_N + \sigma^2_N)^2 + (\sigma^3_N + \sigma^4_N)^2)/4^2, \frac{3}{4}((\sigma^2_N)^2 + (\sigma^3_N + \sigma^4_N)^2)/3^2\right] + \text{etc.} & |M[j] = 4 \end{cases}$$

wherein N is the satellite, M[j] is equal to the number or reference receivers in the ground-based augmentation system station used to compute a combined satellite measurement and wherein each of the $\sigma^1$, $\sigma^2$, $\sigma^3$, $\sigma^4$ correspond to a sigma for a satellite measurement from a respective reference receiver such that $\sigma^1<\sigma^2<\sigma^3<\sigma^4$.

Example 20 includes the non-transitory computer-readable medium of any of Examples 18-19, wherein calculating the first RFI based averaged satellite measurement sigma and the second RFI based averaged satellite measurement sigma is according to the following equations:

$$\sigma^2_{Mon,j}(N, M[j]) = \begin{cases} (\sigma^1_N)^2 & |M[j] = 1, 2 \\ ((\sigma^1_N)^2 + (\sigma^2_N + \sigma^3_N)^2)/3^2 & |M[j] = 3 \\ ((\sigma^1_N + \sigma^2_N)^2 + (\sigma^3_N + \sigma^4_N)^2)/4^2 & |M[j] = 4 \end{cases}$$

wherein N is the satellite, M[j] is equal to the number of reference receivers in a ground-based augmentation system station used to compute a combined satellite measurement and wherein each of the $\sigma^1$, $\sigma^2$, $\sigma^3$, $\sigma^4$ correspond to a sigma for a satellite measurement from a respective reference receiver such that $\sigma^1<\sigma^2<\sigma^3<\sigma^4$.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method for averaging satellite sigmas and readmitting an excluded satellite measurement in the presence of radio frequency interference (RFI), the method comprising:
   receiving via a plurality of reference receivers one or more satellite navigation signals from one or more navigation satellites, wherein each reference receiver in the plurality of reference receivers transforms each satellite navigation signal into a respective satellite measurement to produce one or more satellite measurements;
   calculating from each of the one or more satellite measurements a first RFI based averaged sigma and a second RFI based averaged sigma, wherein the first RFI based averaged sigma comprises an average variance for the satellite measurement calculated by including satellite measurement variances for each of the plurality of reference receivers including the excluded satellite measurement and wherein the second RFI based averaged sigma comprises an average variance for the satellite measurement calculated by including satellite measurement variances for each of the plurality of reference receivers except the excluded satellite measurement;
   readmitting the excluded satellite measurement as a readmitted satellite measurement into either a differential correction broadcast or a respective integrity monitor when the first RFI based averaged sigma is less than or equal to the second RFI based averaged sigma; and
   transmitting a Type 1 Broadcast generated based on the one or more satellite measurements from all of the plurality of reference receivers including the readmitted satellite measurement.

2. The method of claim 1, further comprising: determining when a signal to noise ratio of the excluded satellite measurement is greater than or equal to a readmittance level.

3. The method of claim 1, further comprising: determining when a noise variance of the excluded satellite measurement is less than or equal to a respective monitor readmittance level.

4. The method of claim 1, wherein if there is more than one excluded satellite measurement in a ground-based augmentation system station, the method is performed first on the excluded satellite measurement that has the smallest RFI based averaged sigma.

5. The method of claim 1, wherein the first RFI based averaged sigma and the second RFI based averaged sigma are ground broadcast sigmas.

6. The method of claim 5, wherein calculating the first RFI based averaged sigma and the second RFI based averaged sigma is according to the following equations:

$$\sigma^2_{BB}(N, M[j]) = \begin{cases} \max\left[(\sigma^1_N + \sigma^2_N)^2/2^2, \frac{1}{2}(\sigma^2_N)^2\right] & |M[j] = 2 \\ \max\left[(\sigma^1_N)^2 + (\sigma^2_N + \sigma^3_N)/3^2, \frac{2}{3}(\sigma^2_N + \sigma^3_n)^2/2^2\right] & |M[j] = 3 \\ \max\left[((\sigma^1_N + \sigma^2_N)^2 + (\sigma^3_N + \sigma^4_N)^2)/4^2, \frac{3}{4}((\sigma^2_N)^2 + (\sigma^3_N + \sigma^4_N)^2)/3^2\right] & |M[j] = 4 \end{cases}$$

wherein N is the satellite, M[j] is equal to the number of reference receivers in a ground-based augmentation system station used to compute a combined satellite measurement and wherein each of the $\sigma^1$, $\sigma_2$, $\sigma^3$, $\sigma^4$ correspond to a sigma for a satellite measurement from a respective reference receiver such that $\sigma^1<\sigma^2<\sigma^3<\sigma^4$.

7. The method of claim 1, wherein the first RFI based averaged sigma and the second RFI based averaged sigma are ground monitor sigmas.

8. The method of claim 7, wherein calculating the first RFI based averaged sigma and the second RFI based averaged sigma is according to the following equations:

$$\sigma^2_{Mon,j}(N, M[j]) = \begin{cases} (\sigma^1_N)^2 & |M[j] = 1, 2 \\ ((\sigma^1_N)^2 + (\sigma^2_N + \sigma^3_N)^2)/3^2 & |M[j] = 3 \\ ((\sigma^1_N + \sigma^2_N)^2 + (\sigma^3_N + \sigma^4_N)^2)/4^2 & |M[j] = 4 \end{cases}$$

wherein N is the satellite, M[j] is equal to the number of reference receivers in a ground-based augmentation system station used to compute a combined satellite measurement and $\sigma^1$, $\sigma^2$, $\sigma^3$, $\sigma^4$ correspond to a sigma for a satellite measurement from a respective reference receiver such that $\sigma^1 < \sigma^2 < \sigma^3 < \sigma^4$.

9. A ground-based augmentation system station comprising:
at least one reference receiver, wherein the at least one reference receiver transforms received satellite navigation signals into respective satellite measurements to produce a plurality of satellite measurements that includes an excluded satellite measurement;
at least one memory device; and
at least one processing device communicatively coupled to the at least one reference receiver and the at least one memory device, the at least one processing device configured to:
determine when a first radio frequency interference (RFI) based averaged sigma is less than or equal to a second RFI based averaged sigma, wherein the first RFI based averaged sigma comprises an average variance for a satellite measurement calculated by including satellite measurement variances for each reference receiver including the excluded satellite measurement and wherein the second RFI based averaged sigma comprises an average variance for the satellite measurement calculated by including satellite measurement variances for each reference receiver except the excluded satellite measurement; and
readmit the excluded satellite measurement into either a differential correction broadcast or a respective integrity monitor when the first RFI based averaged sigma is less than or equal to the second RFI based averaged sigma.

10. The ground-based augmentation system station of claim 9, wherein the at least one processing device is further configured to: determine when a signal to noise ratio of the excluded satellite measurement is greater than a readmittance level.

11. The ground-based augmentation system station of claim 9, wherein the at least one processing device is further configured to: determine when a noise variance of the excluded satellite measurement is less than or equal to a respective monitor readmittance level.

12. The ground-based augmentation system station of claim 9, wherein the at least one reference receiver comprises two, three or four reference receivers.

13. The ground-based augmentation system station of claim 9, wherein if there is more than one excluded satellite measurement in the ground-based augmentation system station, the at least one processing device is configured to readmit the excluded satellite measurement that has the smallest RFI based averaged sigma into either differential correction broadcast or the respective integrity monitor when the first RFI based averaged sigma is less than or equal to the second RFI based averaged sigma first.

14. The ground-based augmentation system station of claim 9, wherein the first RFI based averaged sigma and the second RFI based averaged sigma are ground broadcast sigmas.

15. The ground-based augmentation system station of claim 14, wherein the at least one processing device calculates the first RFI based averaged sigma and the second RFI based averaged sigma according to the following equations:

$$\sigma^2_{BB}(N, M[j]) = \begin{cases} \max\left[(\sigma^1_N + \sigma^2_N)^2/2^2, \frac{1}{2}(\sigma^2_N)^2\right] & |M[j] = 2 \\ \max\left[((\sigma^1_N)^2 + (\sigma^2_N + \sigma^3_N)^2/3^2, \\ \frac{2}{3}(\sigma^2_N + \sigma^3_n)^2/2^2\right] & |M[j] = 3 \\ \max\left[((\sigma^1_N + \sigma^2_N)^2 + (\sigma^3_N + \sigma^4_N)^2)/4^2, \\ \frac{3}{4}((\sigma^2_N)^2 + (\sigma^3_N + \sigma^4_N)^2)/3^2\right] & |M[j] = 4 \end{cases}$$

wherein N is the satellite, M[j] is equal to the number of reference receivers in the ground-based augmentation system station and wherein each of the $\sigma^1$, $\sigma^2$, $\sigma^3$, $\sigma^4$ correspond to a sigma for a satellite measurement from a respective reference receiver such that $\sigma^1 < \sigma^2 < \sigma^3 < \sigma^4$.

16. The ground-based augmentation system station of claim 9, wherein the first RFI based averaged sigma and the second RFI based averaged sigma are ground monitor sigmas.

17. The ground-based augmentation system station of claim 16, wherein the at least one processing device calculates the first RFI based averaged sigma and the second RFI based averaged sigma according to the following equations:

$$\sigma^2_{Mon,j}(N, M[j]) = \begin{cases} (\sigma^1_N)^2 & |M[j] = 1, 2 \\ ((\sigma^1_N)^2 + (\sigma^2_N + \sigma^3_N)^2)/3^2 & |M[j] = 3 \\ ((\sigma^1_N + \sigma^2_N)^2 + (\sigma^3_N + \sigma^4_N)^2)/4^2 & |M[j] = 4 \end{cases}$$

wherein N is the satellite, M[j] is equal to the number of reference receivers in the ground-based augmentation system station and wherein each of the $\sigma^1$, $\sigma^2$, $\sigma^3$, $\sigma^4$ correspond to a sigma for a satellite measurement from a respective reference receiver such that $\sigma^1 < \sigma^2 < \sigma^3 < \sigma^4$.

18. A non-transitory computer-readable medium comprising computer program logic recorded thereon for:
receiving via a plurality of reference receivers one or more satellite navigation signals from one or more navigation satellites, wherein each reference receiver in the plurality of reference receivers transforms each satellite navigation signal into a respective satellite measurement to produce one or more satellite measurements;
comparing, for each of the one or more satellite measurements, a first radio frequency interference (RFI) based averaged satellite measurement sigma with a second RFI based averaged satellite measurement sigma; wherein the first RFI based averaged sigma comprises an average variance for the satellite measurement calculated by including satellite measurement variances for each of the plurality of reference receivers including the excluded satellite measurement and wherein the second RFI based averaged sigma comprises an average variance for the satellite measurement calculated by including satellite measurement variances for each of the plurality of satellite measurements except the excluded satellite measurements; and
readmitting the excluded satellite measurement as a readmitted satellite measurement into either a differential correction broadcast or a respective integrity monitor when the first RFI based averaged satellite measurement sigma is less than or equal to the second RFI based averaged satellite measurement sigma; and transmitting a Type 1 Broadcast generated based on the one or more satellite measurements from all of the plurality of reference receivers including the readmitted satellite measurement.

19. The non-transitory computer-readable medium of claim 18, wherein calculating the first RFI based averaged sigma and the second RFI based averaged satellite measurement sigma are calculated using at least one of the following equations:

$$\sigma^2_{pr,gnd,j}(N, M[j]) = \begin{cases} \max\left[(\sigma^1_N + \sigma^2_N)^2/2^2, \frac{1}{2}(\sigma^2_N)^2\right] + \text{etc.} & |M[j]=2 \\ \max\left[(\sigma^1_N)^2 + (\sigma^2_N + \sigma^3_N)^2/3^2, \\ \frac{2}{3}(\sigma^2_N + \sigma^3_n)^2/2^2\right] + \text{etc.} & |M[j]=3 \\ \max\left[((\sigma^1_N + \sigma^2_N)^2 + (\sigma^3_N + \sigma^4_N)^2)/4^2, \\ \frac{3}{4}((\sigma^2_N)^2 + (\sigma^3_N + \sigma^4_N)^2)/3^2\right] + \text{etc.} & |M[j]=4 \end{cases}$$

wherein N is the satellite, M[j] is equal to the number of reference receivers in the ground-based augmentation system station used to compute a combined satellite measurement and wherein each of the $\sigma^1$, $\sigma^2$, $\sigma^3$, $\sigma^4$ correspond to a sigma for a satellite measurement from a respective reference receiver such that $\sigma^1<\sigma^2<\sigma^3<\sigma^4$.

20. The non-transitory computer-readable medium of claim 18, wherein calculating the first RFI based averaged satellite measurement sigma and the second RFI based averaged satellite measurement sigma is according to the following equations:

$$\sigma^2_{Mon,j}(N, M[j]) = \begin{cases} (\sigma^1_N)^2 & |M[j]=1,2 \\ ((\sigma^1_N)^2 + (\sigma^2_N + \sigma^3_N)^2)/3^2 & |M[j]=3 \\ ((\sigma^1_N + \sigma^2_N)^2 + (\sigma^3_N + \sigma^4_N)^2)/4^2 & |M[j]=4 \end{cases}$$

wherein N is the satellite, M[j] is equal to the number of reference receivers in a ground-based augmentation system station used to compute a combined satellite measurement and wherein each of the $\sigma^1$, $\sigma^2$, $\sigma^3$, $\sigma^4$ correspond to a sigma for a satellite measurement from a respective reference receiver such that $\sigma^1<\sigma^2<\sigma^3<\sigma^4$.

* * * * *